3,338,823
REGENERATION OF SULFOLANE EXTRACTIVE DISTILLATION SOLVENT
Heinz Voetter, Amsterdam, Netherlands, assignor to Shell Oil Company, New York, N.Y., a corporation of Delaware
Filed Feb. 24, 1964, Ser. No. 346,829
Claims priority, application Netherlands, Mar. 1, 1963, 289,649
10 Claims. (Cl. 208—313)

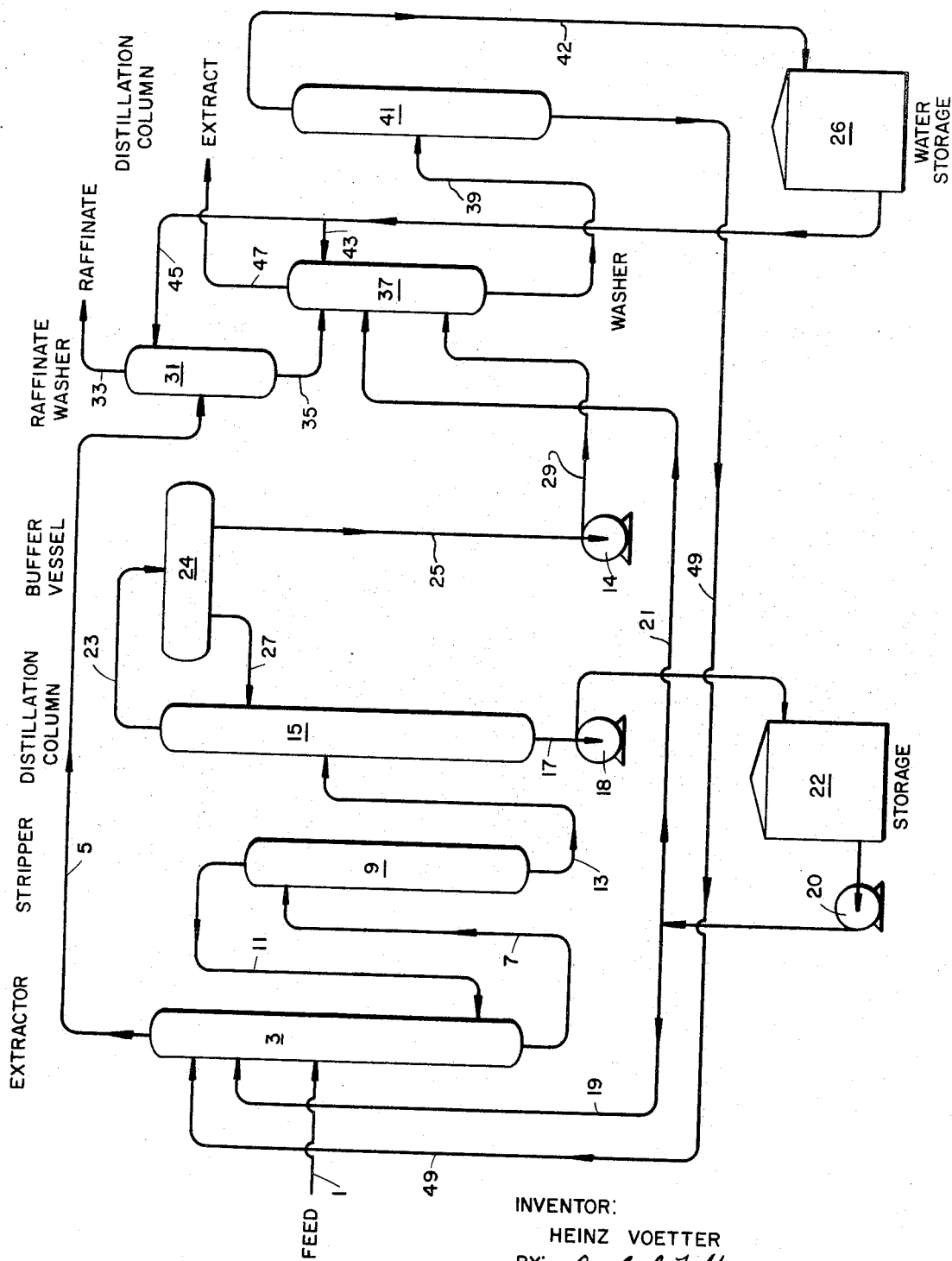

The invention relates to a process for the extractive fractionation of hydrocarbon mixtures containing aromatics which involves the use of a cyclic sulfone or cyclic sulfoxide as a selective extracting agent, and the recovery thereof. More particularly, the invention pertains to an improved technique for recovery of the extracting agent.

The use of a sulfolane to extract aromatics is already known and is taught in U.S. Patent No. 2,360,861 issued Oct. 24, 1944, to Pierotti et al. In that process, the recovery of the extracting agent is accomplished by washing extract phase and raffinate phase with water. Such a process has the disadvantage that in order to remove the extracting agent from the extract completely a large quantity of water has to be added, so that the subsequent, necessary distillation of the dilute aqueous extracting agent solution entails disproportionately high costs, and so renders the whole extraction process uneconomical.

If, as is mostly the case where cyclic sulfones or sulfoxides are used, the boiling point of the extracting agent is higher than the boiling point or boiling range of the hydrocarbon mixture to be extracted, it should be possible, by distilling the extract phase, to obtain the extracting agent directly as a bottom product. When, however, the hydrocarbon mixture to be extracted includes aromatic components that have such a high boiling point that they remain in the extracting agent when the extract phase is distilled, the recycle of extracting agent to the extraction system will cause such aromatic components to accumulate, and the separation of the hydrocarbon mixture into aromatics and non-aromatics will be unfavorably affected.

Now, the present invention concerns a process such as is suitable for use in the extraction of hydrocarbon mixtures containing aromatics with a boiling point such that upon distillation of the extract phase they remain in the extracting agent.

The invention, then, relates to a process for the extractive fractionation of hydrocarbon mixtures containing aromatics which involves the use of a cyclic sulfone or cyclic sulfoxide as a selective extracting agent and the recovery thereof, characterized in that the recovery operation is carried out by washing the raffinate phase with water, fractionating the extract phase by distillation into an aromatic fraction, which is washed with water, and an extracting agent fraction, which is recycled, withdrawing a small portion of the recycle extracting agent fraction as a slip-stream, and purifying same by washing with water, distilling the resulting mixtures of water and extracting agent and recycling the purified extracting agent obtained as the bottom product to the extraction system.

Thus in one aspect, the instant invention pertains to a process for the extractive fractionation of a hydrocarbon mixture containing aromatics employing a sulfolane extracting agent selective for aromatics which comprises contacting said mixture with said agent in a contacting zone whereby are formed, as two separate phases, a raffinate comprising predominantly non-aromatics, but containing some extracting agent and an extract comprising predominantly aromatics and extracting agent; passing said extract to a distillation zone from which are recovered an aromatic fraction and an extracting agent fraction containing at least some aromatics having a boiling point as high as said extracting agent; washing said aromatic fraction and a portion or slip-stream of said extracting agent fraction with water to form an aqueous extracting agent phase and an aromatics product phase; separating said extracting agent from said aqueous extracting agent phase in a second distillation zone; and recycling the extracting agent recovered from said second distillation zone to said contacting zone.

The invention may, of course, also be applied if the impurities accumulating in the recycle extracting agent are not aromatics, provided that when water is added to the slip-stream said impurities separate out or are easy enough to extract from the slip-stream-water mixture.

Within the scope of the invention extraction may be carried out by any known technique—for example, liquid-liquid extraction or extractive distillation, with the aid of extraction columns or distillation columns, or with the aid of a rotating-disc contactor. Extraction may be carried out, for example, in an extraction column provided with packed sections or sieve plates, with the extract phase so obtained entering a stripper at a point above the middle thereof, the top product of aromatics returning to the extraction column, and the bottom product, a solution of aromatics in extracting agent, passing to the distillation section.

The raffinate phase obtained from the extraction operation will only contain a relatively small proportion of the extracting agent, the amount generally ranging 0.2 to 1.0% weight of the raffinate. Upon the addition of water, a mixture of water and extracting agent separates out and is removed from the washed raffinate. The amount of water added will be at least 3 parts by weight for every part by weight of extracting agent. Washing of the raffinate may be carried out according to known techniques. An efficient method—and the one preferably applied—is a procedure of washing with the aid of a rotating-disc contactor such as described, for example in U.S. Patent No. 2,601,674 issued June 24, 1952, to Reman.

Distillation of the extract phase may be carried out according to known techniques. Where the hydrocarbon mixture to be extracted is treated with extracting agent by a method of liquid-liquid extraction, distillation of the extract phase may, for example, be carried out in a two-column system. If a method of extractive distillation is used for separating the starting mixture, then as a rule one main column will be employed in the distillation of the extract phase.

The aromatic fraction will contain a quantity of extracting agent that—depending on, among other factors, the distillation conditions applied and on the boiling point of the extracted aromatics—will vary from 0 to 50% weight calculated on the whole fraction. In the washing operation use is preferably made of a rotating-disc contactor, although other liquid-liquid contactors may be employed and the amount of water used being at least 3 parts by weight for every part by weight of extracting agent.

The slip-stream drawn from the recycle extracting agent will—depending, of course, on the magnitude of the slip-stream relative to that of the recycle stream and on the extent to which the high-boiling impurities are allowed to accumulate in the recycle stream—generally contain more than 99% weight of extracting agent. To every part by weight of sidestream are added at least 3 parts by weight of water, whereupon the high-boiling impurities then separating out are removed. Here, too, the aforesaid rotating-disc contactor will preferably be employed.

It is, of course, possible for the washing of raffinate phase, aromatic fraction and slipstream to be carried out as separate operations. It is, however, preferable for two or all of the washing operations to be combined in some way or other. Depending on operating conditions and facilities, then, the washing of the aromatic fraction will be combined with the washing of the slipstream, or the mixture of water and extracting agent obtained from the washing of the raffinate phase will be added to the slipstream, and the total mixture be washed. In the latter case it is advantageous for the aromatic fraction obtained from the distillation of the extract phase not be washed separately, but likewise to be added to the slipstream. Another combination is one in which the aromatic fraction, the slipsteam and the mixture of water and extracting agent resulting from the water-washing of the raffinate phase enter a contactor separately—the aromatic fraction at a point located near the aqueous-phase outlet, the mixture of water and extracting agent at a point located near the washing-water inlet in such a way that said mixture meets the washing-water in countercurrent, and the slipstream at a point located between the points of entry of aromatic fraction and said mixture. For these latter combinations, too, it is advantageous, to use said rotating-disc contactor.

After distillation of the resulting, and preferably combined aqueous extracting-agent solutions, the pure extracting-agent obtained is recycled to the extraction system as a purified slipstream.

Return of the purified slipstream to the extraction system will preferably take place at a point located between the inlet of the recycle extracting-agent fraction and the outlet of the reaffinate phase. Heavy aromatics in the recycle extracting-agent phase will then be prevented from being entrained in the raffinate. As a result, a slightly greater accumulation of heavy aromatics may be tolerated in the recycle extracting agent, so that a smaller slipstream may be taken for purification.

Especially eligible as the sulfolane extracting agents which are selective for aromatics are the cyclic sulfones with 5 carbon atoms in the ring. Such sulfones are sulfolane and sulfolene and their derivatives such as are known, for example, from U.S. Patents Nos. 2,360,860, issued Oct. 24, 1944, to Morris et al., and 2,360,861 (previously identified).

Preferred of these compounds are those having the general formula:

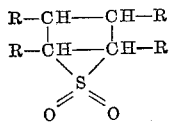

where R can be a hydrogen atom, an alkyl group having up to 10 carbon atoms, an alkoxy radical having up to 8 carbon atoms, an arylalkyl radical having up to 12 carbon atoms or mixtures thereof.

Of these sulfones, sulfolane, also known as tetrahydrothiophene-1,1-dioxide, wherein all R's are hydrogen, is especially eligible for application.

The process according to the invention may be applied to hydrocarbon mixtures with either narrow or wide boiling ranges. It is suitable for the production of aromatics from catalytically reformed gasolines containing heavy aromatic components—such as hydroformates and platformates with high final boiling points—and in particular for the preparation of aromatic-free kerosene from heavy kerosene. By heavy kerosene is meant an aromatic-containing kerosene with an ASTM final boiling point above 250° C.

The invention will be further elucidated with the aid of the appended drawing which comprises a single figure illustrating an embodiment of the instant invention wherein aromatics are extracted from a heavy kerosene fraction. The drawing for the post part omits auxiliary equipment such as regulators, coolers, heaters, valves, pumps and the like which of course would be apparent to those of ordinary skill in the art.

*Example*

The feed was a heavy kerosene with a boiling range (ASTM) of 205–315° C. and an aromatic content of 20% weight.

A hundred parts by weight of this feed per hour was admitted through conduit 1 (see drawing) to the extractor 3 which was a rotating-disc contactor. Extraction was carried out at a pressure of 1 atmosphere absolute and a temperature of 160° C. The extracting agent was sulfolane, added to the contactor in the form of an extracting agent fraction at the rate of 491 parts by weight (490 parts by weight sulfolane, 1 part by weight heavy aromatics) an hour, and in the form of pure extracting agent through conduit 49 at the rate of 10.5 parts by weight an hour. Through conduit 5, 84.5 parts by weight an hour of raffinate phase (84 parts by weight hydrocarbons and 0.5 part by weight sulfolane) were withdrawn. The extract phase (504 parts by weight sulfolane and 53 parts by weight hydrocarbons an hour) passed through conduit 7 to the stripper 9, where at a pressure of 60 millimeters of mercury and a bottom temperature of 190° C. a portion was returned over the top through conduit 11 to the bottom of contactor 3 (40 parts by weight an hour, composed of 36 parts by weight of hydrocarbons and 4 parts by weight of sulfolane). The remainder, 517 parts by weight (500 parts by weight sulfolane, 17 parts by weight hydrocarbons) an hour, was removed from the stripper as a bottom product through conduit 13. Recovery of the extracting agent from the extract phase in conduit 13 was carried out by passing the extract phase via conduit 13 to distillation column 15, where at a pressure of 40 millimeters of mercury, a bottom temperature of 200° C. and a top temperature of 150° C. it was split into an extracting agent fraction, which was passed via conduit 17 and pump 18 to a storage tank 22, and an aromatic fraction, which was passed through conduit 23 to the buffer vessel 24. The aromatic fraction amounted to 35 parts by weight an hour, the extracting-agent fraction to 496 parts by weight an hour. The latter amount was pumped out of tank 22 via pump 20 and subsequently split into a portion amounting to 491 parts by weight an hour, which was recycled through conduit 19 to contactor 3, and a portion amounting to 5 parts by weight (containing 0.01 part by weight of heavy aromatics), which was withdrawn as a slipstream via conduit 21 to the middle of contactor 37.

From buffer vessed 24, 14 parts by weight an hour of the aromatic fraction was returned via conduit 27 to the top of distillation column 15, and 21 parts by weight an hour (16 parts by weight hydrocarbons and 5 parts by weight sulfolane) was passed via conduit 25 and pump 14 and conduit 29 to the aforesaid contactor 37.

The raffinate phase from extractor 3 was passed via conduit 5 to and washed in rotating-disc contactor 31 at a temperature of 60° C. with water coming from storage vessel 26 and admitted to the top of contactor 31 via conduit 45. Four parts by weight of water were admitted per hour. The amount of washed raffinate, removed via conduit 33, came to 84 parts by weight an hour. The aqueous phase, obtained as a bottom product, amounted to 4.5 parts by weight (4.0 parts by weight water, 0.5 part by weight sulfolane) an hour. The latter passed via conduit 35 to contactor 37—another rotating-disc contactor. The temperature in this contactor was 60° C. The aqueous sulfolane solution from conduit 35 was introduced into contactor 37 at a point located above the point of entry of conduit 21 but below the point of entry of pure washing-water coming from storage vessel 26 and admitted via conduit 43 at the rate of 36 parts by weight an hour. The washed extract issued from the top of the contactor at the rate of 16 parts by weight an hour and was removed via conduit 47. The bottom of the contactor delivered a stream of aqueous extracting agent amounting to 50.5 parts by weight (40 parts by weight water, 10 parts by weight sulfolane) an hour. This was passed to distillation column 41 via conduit 39. The pressure in the column was 150 millimeters of mercury, and the bottom temperature 180° C. The pure sulfolane issued from the bottom of this column at the rate of 10.5 parts by weight an hour and was recycled via conduit 49. The water issued as the top product and passed to storage vessel 26 via conduit 42 at the rate of 40 parts by weight an hour.

The aromatic content of the washed extract, removed via conduit 47, came to 95% weight. The aromatic content of the washed raffinate, removed via conduit 33, was 6% weight.

I claim as my invention:

1. A process for the extractive fractionation of a hydrocarbon mixture containing aromatics employing a sulfolane extracting agent selective for aromatics comprising the following steps:
   (a) contacting said mixture with said agent in a contacting zone whereby are formed, as two separate phases, a raffinate phase comprising predominantly non-aromatics, but containing some extracting agent, and an extract phase comprising predominantly aromatics and extracting agent;
   (b) passing said extract phase to a distillation zone from which are recovered an aromatic fraction and an extracting agent fraction containing at least some aromatics having a boiling point as high as said extracting agent;
   (c) washing said aromatic fraction with water;
   (d) withdrawing a portion of said extracting agent fraction as a slip-stream and washing said slip-stream with water;
   (e) recovering an aqueous extracting agent phase and an aromatic product phase resulting from step (d);
   (f) separating said extracting agent from said aqueous extracting agent phase in a second distillation zone; and
   (g) recycling the extract agent recovered from said second distillation zone to said contacting zone.

2. The process of claim 1 where the extracting agent fraction recovered from the first distillation zone is recycled to the contacting zone at a point below the outlet of the raffinate phase and wherein the extracting agent fraction recovered from the second distillation zone is recycled to the contacting zone at a point located between the inlet of the recycle of said extracting agent fraction recovered from said first distillation zone and the outlet of the raffinate phase.

3. The process of claim 1 wherein a rotating-disc contactor is employed for the water-washing operation.

4. The process of claim 1 wherein sulfolane is employed as the extracting agent.

5. The process of claim 1 wherein the mixture to be fractionated is a catalytically reformed hydrocarbon fraction.

6. The process of claim 1 wherein the mixture to be fractionated is a heavy kerosene.

7. The process of claim 1 wherein the extracting agent is a compound having the formula:

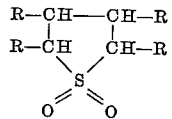

wherein R is selected from the group consisting of a hydrogen atom, an alkyl group having up to 10 carbon atoms, an alkoxy radical having up to 8 carbon atoms, an arylalkyl radical having up to 12 carbon atoms and mixtures thereof.

8. The process of claim 1 wherein the washing of the aromatic fraction and a portion of the extracting agent fraction are combined in a single washing zone.

9. The process of claim 8 wherein the raffinate phase is separately washed with water to form a washed raffinate product and an aqueous bottoms fraction and wherein said bottoms fraction is introduced to said single washing zone.

10. A process for the extractive fractionation of a hydrocarbon mixture containing aromatics employing a sulfolane extracting agent selective for aromatics comprising the following steps:
   (a) contacting said mixture with said agent in a contacting zone whereby are formed, as two separate phases, a raffinate phase comprising predominantly non-aromatics, but containing some extracting agent, and an extract phase comprising predominantly aromatics and extracting agent;
   (b) passing said extract phase to a distillation zone from which are recovered an aromatic fraction and an extracting agent fraction containing at least some aromatics having a boiling point as high as said extracting agent;
   (c) withdrawing a portion of said extracting agent fraction as a slip-stream;
   (d) separately washing said raffinate phase with water to form a raffinate product and a mixture of water and extracting agent;
   (e) separately introducing into a washing zone and mixing therein (1) the aromatic fraction, (2) the slip-stream portion of the extracting agent fraction and (3) the mixture of water and extracting agent resulting from the water washing of the raffinate phase to form an aqueous extracting agent phase and an aromatic product phase and wherein the aromatic fraction is introduced at a point located near said aqueous extracting agent phase outlet, the mixture of water and extracting agent is introduced at a point located near the washing-water inlet countercurrent to the flow of washing water, and the slip-stream portion is introduced at a point located between the points of entry of the aromatic fraction and said mixture;
   (f) separating said extracting agent from said aqueous extracting agent phase in a second distillation zone; and
   (g) recycling the extracting agent recovered from said second distillation zone to said contacting zone.

References Cited
UNITED STATES PATENTS

| | | | |
|---|---|---|---|
| 2,360,861 | 10/1944 | Pierotti et al. | 208—325 |
| 3,200,065 | 8/1965 | Cottington | 208—321 |
| 3,249,532 | 5/1966 | Shiah | 208—321 |

DELBERT E. GANTZ, *Primary Examiner.*

HERBERT LEVINE, *Examiner.*